United States Patent
Kunes et al.

(10) Patent No.: US 10,430,048 B2
(45) Date of Patent: Oct. 1, 2019

(54) AIRPORT AVAILABILITY AND SUITABILITY INFORMATION DISPLAY

(71) Applicant: HONEYWELL INTERNATIONAL INC., Morris Plains, NJ (US)

(72) Inventors: David Kunes, Tisnov (CZ); Zdenek Moravek, Rozdrojovice (CZ); Katerina Chmelarova, Hradec Kralove (CZ); Ivan Lacko, Cana (SK)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 269 days.

(21) Appl. No.: 15/245,317

(22) Filed: Aug. 24, 2016

(65) Prior Publication Data
US 2018/0059907 A1    Mar. 1, 2018

(51) Int. Cl.
| | | |
|---|---|---|
| G06F 3/048 | (2013.01) | |
| G06F 3/0484 | (2013.01) | |
| G08G 5/02 | (2006.01) | |
| G06F 3/0482 | (2013.01) | |
| G06F 3/0489 | (2013.01) | |

(52) U.S. Cl.
CPC ........ G06F 3/04842 (2013.01); G06F 3/0482 (2013.01); G06F 3/04892 (2013.01); G08G 5/025 (2013.01)

(58) Field of Classification Search
CPC ..................................................... G06F 3/048
See application file for complete search history.

(56) References Cited

U.S. PATENT DOCUMENTS

| | | | | |
|---|---|---|---|---|
| 8,565,944 | B1 * | 10/2013 | Gershzohn | G08G 5/0039 701/1 |
| 9,002,544 | B1 * | 4/2015 | Seah | G01C 23/00 701/16 |
| 9,032,319 | B1 * | 5/2015 | Hammack | G06F 3/0486 715/769 |
| 2010/0042316 | A1 | 2/2010 | Caillaud | |
| 2011/0246176 | A1 * | 10/2011 | Arasada | G06Q 10/06 704/3 |
| 2014/0309821 | A1 | 10/2014 | Poux et al. | |

OTHER PUBLICATIONS

N.A., "5 Garmin Pilot Features You Probably Aren't Using," iPad Pilot News from Sporty's Pilot Shop, May 14, 2015.
Extended EP Search Report of Application No. 17184601.7 dated May 16, 2018.

* cited by examiner

*Primary Examiner* — Xuyang Xia
(74) *Attorney, Agent, or Firm* — Lorenz & Kopf, LLP (57) ABSTRACT

A system and method for an improved aircraft information display is provided. The provided embodiments integrate and analyze relevant data from on-board and external sources to render airport availability and suitability information on the aircraft information display. The airport availability and suitability information displayed on the aircraft information display incorporates links between related information, is intuitively arranged on the aircraft information display, and dynamically updates responsive to changes in data and to user interaction.

12 Claims, 8 Drawing Sheets

AIRPORT AVAILABILITY AND SUITABILITY INFORMATION DISPLAY

GOVERNMENT RIGHTS

This invention was made with Government support awarded by the Electronic Components and Systems for European Leadership (ECSEL, formerly Artemis), under the contract ARTEMIS Project number: 332933. The Government has certain rights in this invention.

TECHNICAL FIELD

Embodiments of the subject matter described herein relate generally to vehicle information displays and, more particularly, to an aircraft information display providing airport availability and suitability information.

BACKGROUND

When assessing availability and suitability of any particular airport for landing, the crew of an aircraft has to take into account a large amount of information stored in different storage locations and/or displayed in different locations around a cockpit.

When a diversion related situation occurs during landing, a pilot may learn from a notice to airmen (NOTAM) message that there is a runway shortage condition (or other relevant warning). The crew then calculates, given the current weight of the aircraft, whether they can still land safely at the particular runway. However, without integrating the NOTAM message with relevant information from other sources, a complete picture of the safety of the intended landing cannot be visualized. For example, integrating the NOTAM message with a current airport meteorological message (METAR) reporting wet runway surfaces, may provide an indication that aircraft braking performance will be compromised and the available runway length may not be sufficient. Preparation for landing is a cognitively demanding task, and even when a pilot references other sources for relevant information, the added cognitive burden from attempting to quickly integrate, visualize, and incorporate complex links among related pieces of relevant information in making landing decisions may be very high.

The herein described invention provides a system and method for an improved aircraft information display. The provided airport availability and suitability system embodiments integrate and analyze relevant data from on-board and external sources to render airport availability and suitability information on the aircraft information display. The airport availability and suitability system incorporates links between related pieces of information, is intuitively arranged, and dynamically updates responsive to user interaction. The technical effect of the invention is a reduction of time and increase in likelihood that a user will incorporate related pieces of information in making landing decisions.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A system for displaying airport information on a portable electronic device (PED), the PED comprising a display device, is presented. The system comprises: a source of Aviation Information Publication (AIP) data; a database comprising airport static information and relatedness rules; and a processor configured to process data received from the source of AIP data, the database, a source of aircraft status data, a source of aircraft location data, a source of weather data, and a source of tactical data, to (1) generate an image on the display device, the image concurrently rendering, in a first presentation style, (a) a first section comprising airport information items and aircraft status data, (b) a second section rendering a plurality of suitability items comprising weather data and tactical data, and (c) a third section rendering airport options, (2) identify a change in data, (3) responsive to the identified change in data, determine related items, defined as (a) all airport information items affected by the identified change in data (b) all suitability items affected by the identified change in data, and (c) all aircraft status data affected by the identified change in data, and (4) responsive to determining related items, render the related items on the image using a second presentation style.

Another system for displaying airport information on a display device is presented, the system comprising: a source of Aviation Information Publication (AIP) data; and a processor configured to process data received from the source of AIP data, a source of aircraft status data, a source of aircraft location data, a source of weather data, and a source of tactical data, to (1) generate an image on the display device, the image concurrently rendering, in a first presentation style, (a) a first section comprising airport information items and aircraft status data, (b) a second section rendering a plurality of suitability items comprising weather data and tactical data, and (c) a third section rendering airport options, (2) responsive to an identified change in data, determine related items, defined as (a) all airport information items affected by the identified change in data (b) all suitability items affected by the identified change in data, and (c) all aircraft status data affected by the identified change in data, and (3) responsive to determining related items, render the related items on the image using a second presentation style.

Also provided is a method for displaying airport information on a portable electronic device (PED), the method comprising: receiving, from a source of Aviation Information Publication (AIP) data, AIP data; receiving from an on-board data source, aircraft status data and aircraft location data; receiving from an external source weather data and tactical data; and processing AIP data, aircraft status data, aircraft location data, weather data, and tactical data to, (1) generate an image on the display device, the image concurrently rendering, in a first presentation style, (a) a first section comprising airport information items and aircraft status data, (b) a second section rendering a plurality of suitability items comprising weather data and tactical data, and (c) a third section rendering airport options, (2) identify a change in data, (3) responsive to the identified change in data, reference a relatedness database to determine related items, and (4) responsive to determining related items, render the related items on the image using a second presentation style.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to the transmittal of data, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein provides a system and method located on a portable device (PED) that may be carried onboard a vehicle or aircraft. Accordingly, the referred to aircraft information display utilizes the display device of the PED. However, it is readily apparent that in various embodiments, the provided system and method may be located on or integrated with a stationary structure and/or onboard a vehicle or aircraft, and may command various display devices to render the improved aircraft information display described herein. The embodiment described herein is merely an example and serves as a guide for implementing the novel systems and method herein on any vehicle display in any industrial, commercial, military, or consumer application. As such, the examples presented herein are intended as non-limiting.

Figure 1:
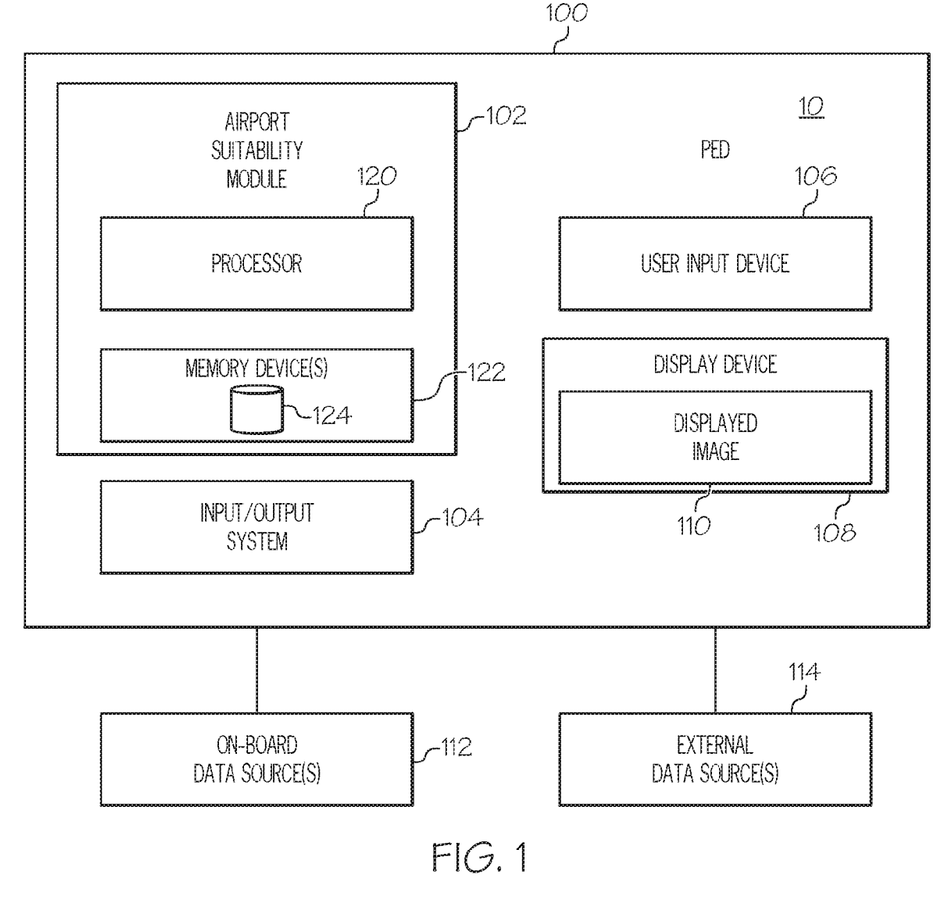
FIG. 1 is a system level block diagram of an airport availability and suitability system, in accordance with various embodiments.

As mentioned, the provided airport availability and suitability system embodiments integrate and analyze relevant data from on-board and external sources to render airport availability and suitability information on the aircraft information display, and that information display may be presented on a variety of display devices. FIG. 1 depicts a system level block diagram of an airport availability and suitability system 100, in accordance with various embodiments. The airport availability and suitability system 100 displays information on a display device associated with a PED 10; accordingly, some or all of the components of the airport availability and suitability system 100 may reside on the PED 10. An airport availability and suitability module (simplified hereinafter to "airport suitability module 102") is coupled to an input/output system 104, user input device 106, and display device 108. The airport availability and suitability system 100 may be operatively coupled to one or more on-board data sources 112 and one or more external data sources 114.

The airport suitability module 102 includes a processor 120 and memory devices 122. The processor 120 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The processor 120 includes or cooperates with an appropriate amount of memory (for example memory device(s) 122), which can be realized as RAM memory, flash memory, EPROM memory, EEPROM memory, data storage device such as database 124, registers, a hard disk, a removable disk, a CD-ROM, or any other form of storage medium known in the art. In this regard, the memory device(s) 122 can be coupled to the processor such that the processor can read information from, and write information to, the memory device(s) 122. In the alternative, the memory device(s) 122 may be integral to the processor 120. In practice, a functional or logical module/component of the system 100 described herein may be realized using an operating program that is stored locally in the memory device(s) 122. The operating program may be transmitted wirelessly or via a ground line, CD, hard disk, USB stick, shop loader device, or similar device, to the airport availability and suitability system 100.

In operation, the airport suitability module 102 is configured to continually receive and process data from at least a source of Aviation Information Publication (AIP) data, a source of aircraft status data, a source of aircraft location data a source of weather data and a source of tactical data. To send and receive data, the airport suitability module 102 is further configured to command the input/output system 104 to send and receive wired and wireless communication. The input/output system 104 is suitable to provide the bandwidth and sequencing protocols required for transmission of data between electronic subsystems onboard the aircraft and also aircraft to ground exchange of data.

As mentioned, data may be received via wireless or wired communication. Wireless communication may include data from external data sources 114, such as air traffic control (ATC), traffic information service and broadcast (TIS-B), automatic dependent surveillance broadcast (ADS-B), an aircraft communications addressing and reporting system (ACARS), a satellite, a source of Aviation Information Publication (AIP) data, and similar sources. Wired communication may include data from on-board data sources 112. On-board data sources 112 include (i) sensors, devices, instruments (such as on-board radar, radar altimeter, a global positioning system (GPS)), and software, sufficient for detecting and providing aircraft status data (including speed, location, position, remaining fuel, faults, conditions, and detected weather and temperature), and (ii) aircraft databases, such as database 124, that store aircraft identification information, airport static information, and "relatedness rules" which comprise program code, pre-defined rules for relations among various pieces of information, rules, and algorithms sufficient to perform the functions described herein.

The airport suitability module 102 is configured to process data from the above described sources and to dynamically generate and render therefrom an image 110 on the display device 108. As mentioned, display device 108 may be an existing component of the PED 10, and may utilize any technology, such as light emitting diodes (LED), liquid-crystal display (LCD), plasma display panel (PDP), etc., sufficient to render the images 110 described herein. A user generally submits input to the airport suitability module 102 by operating the user input device 106 in response to viewing the image 110 on the display device 108. The user input device 106 may be an existing component of the PED 10, and may include any combination of one or more of the following: a keypad, touchpad, keyboard, mouse, touchscreen, joystick, knob, microphone, speech or gesture recognition or another suitable device adapted to receive input from a user. The user input device 106 may further comprise a user interface configured to generate and render a series of displayable menu selection options to direct and respond to the user.

Figure 2:
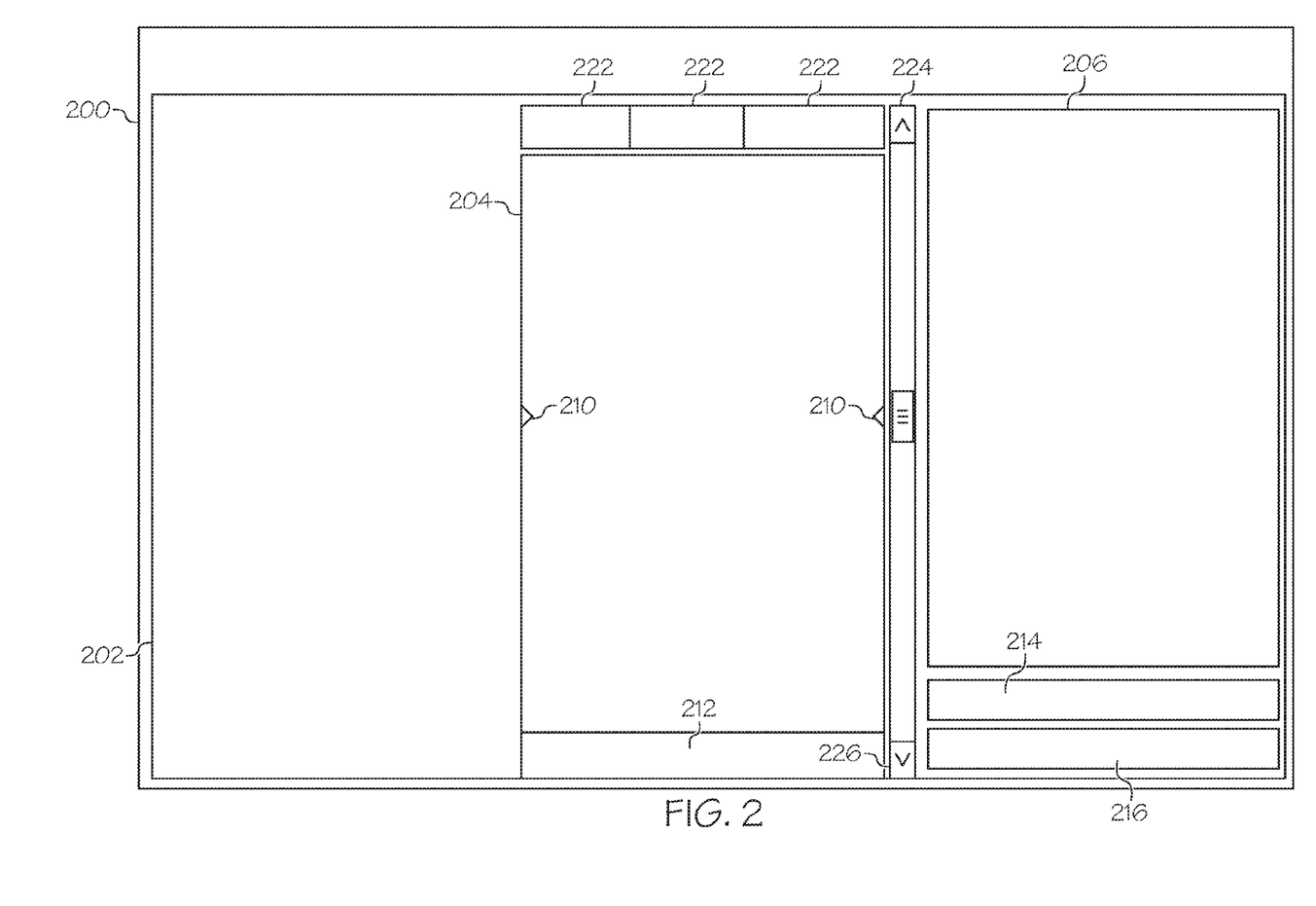
FIG. 2 is a simplified illustration of an arrangement of airport availability and suitability information, in accordance with various embodiments.

FIG. 2 is a simplified illustration of an arrangement of airport availability and suitability information, generated and rendered in accordance with various embodiments. The image 200 is on the display device 108 of the PED 10. The image 200 concurrently renders a first section 202, a second section 204, and a third section 206. As will be described in more detail in connection with FIGS. 3-6, each section comprises alphanumeric information initially rendered in a first presentation style (also referred to as a default presentation style), that reflects a combination of user selected information and system determined linkages between related items. In the embodiment shown in FIG. 2, the sections are substantially abutted, and each of these sections takes up approximately one third of the image 200. In other embodiments, the airport suitability module 102 may resize or rearrange the sections, based on the display device 108, to enhance the visual accessibility or intuitiveness of the display of the alphanumeric information.

The second section 204 comprises one or more buttons or tabs 222 that are described in more detail in connection with FIG. 3. The bottom of the second section 204 comprises a text banner 212 providing the number of items in the selected menu tab. An "up" indicator 224 and a "down" indicator 226 enable scrolling through the second section 204, in order to enable the user to view all items listed by the text banner 212. Additional information associated with un-displayed tabs 222 in the second section 204 may be displayed in the third section 206 as, for example, a first text block 214 and a second text block 216.

A user may easily maneuver around displayed image 200 by submitting user input via the user input device 106, as described above. A symbol 210, such as a tick or arrow, generally stays in the same location on the displayed image as the user moves the information around. In practice, the user may scroll or slide information around on the displayed image, or select buttons or tabs with the user input device 106; to achieve a "user selection," the user moves the information until a desired piece of information is at the symbol 210 and ceases user input. This flexibility advantageously enables a user to study how the selected piece of information is related to other information on the displayed image 200. Moving next to FIGS. 3-6, the alphanumeric content of the various sections in image 200 is described.

Figure 3:
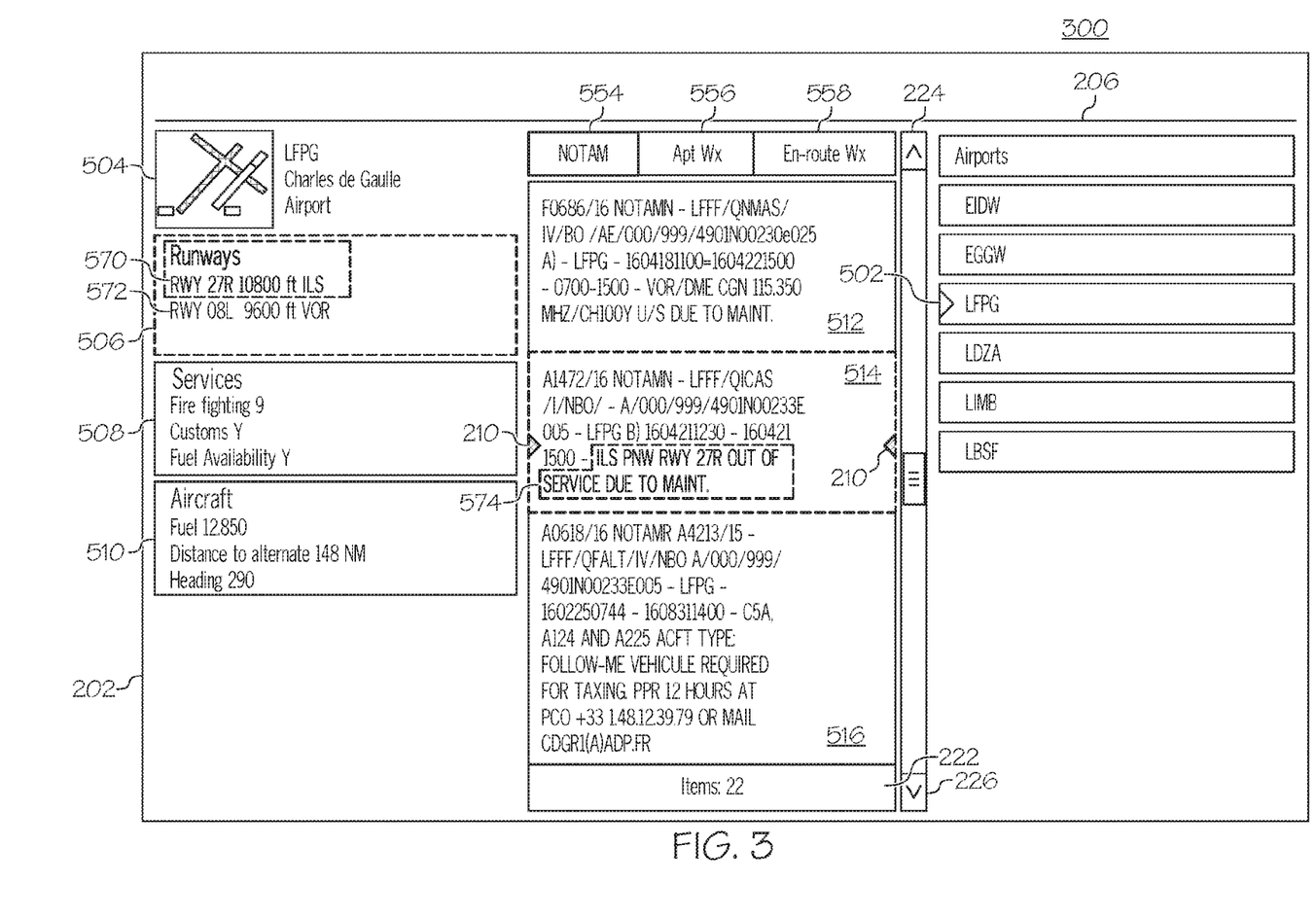
FIG. 3 is an image rendered on the aircraft information display device in accordance with various embodiments.

FIG. 3 is a displayed image 300 generated and rendered on display device 108 in accordance with various embodiments. FIG. 3 may be a starting image. The first section 202 of image 300 comprises "airport information and aircraft status data," which comprises region 504, region 506, region 508, and region 510. Region 504 shows an airport designated "LFPG" (Charles de Gaulle), and an image of the runways layout at the airport LFPG. Below region 504, region 506 displays runways at LFPG, region 508 displays services at LFPG, and region 510 displays aircraft information (i.e., aircraft status data including speed, location, position, remaining fuel, faults, conditions, and detected weather and temperature). On the right side of image 300, the third section 206 (displaying airport options) shows LFPG selected, as indicated by the selection symbol 502 pointing to LFPG.

Suitability items comprising weather data (556 and 558) and tactical data (554) are rendered in the second section 204. The suitability items are organized into menu tabs that, when selected, cause the respective subset of suitability items to be rendered. In FIG. 3, notice to airmen (NOTAM) tab 554 is selected and displayed, while an airport weather "Apt Wx" tab 556 and en-route weather "En-route Wx" tab 558 are not selected. In accordance with the selection of the NOTAM tab 554, a first NOTAM 512, a second NOTAM 514, and a third NOTAM 516 are rendered alphanumerically, each as a text box having a boundary or border. Text banner 212 indicates that there are 22 total items in the selected NOTAM tab 554.

As can be seen, each region or text box the sections 204, 206, 208 is initially rendered in a default or first presentation style, defined at least by a fill, a boundary, and a font. In the example shown in FIG. 3, the first presentation style comprises a white background, black font, and black boundaries or borders. However, the first presentation style may comprise any other color combinations, shading, flashing, hatching, and/or border designs sufficient to present the information in a visually perceptible manner.

The airport availability and suitability system 100 is configured to continually monitor data from the input sources to dynamically generate and render the image 300. When data from an input source changes, the airport suitability module 102 identifies the change in data and updates the image 300 by visually distinguishing changed data and/or related data from the remaining alphanumeric information on the rendered image 300. As may be readily appreciated, at any given time, more than one change in data may be identified; accordingly, the airport availability and suitability system 100 updates the image 300 by visually distinguishing changed data and/or related data. The following figures and description provide examples of visually distinguished alphanumeric data.

As shown in FIG. 3, an identified "change in data" 574 is depicted in a portion of the second NOTAM 514. The change in data 574 is a warning stating "ILS PNW RWY 27R OUT OF SERVICE DUE TO MAINT." The airport availability and suitability system 100 processes the change in data 574 to determine all "related items," in each of the three sections (202, 204, and 206). Processing of related items is described in more detail in connection with FIG. 7 and FIG. 8, and, as used herein, "related items" comprise (a) all airport information items related to the identified data change, (b) all suitability items related to the identified change in data, and (c) all aircraft status data related to the identified change in data. When the user selects the warning or change in data 574 (by moving the list so that symbol 210 is pointing to the warning or change in data 574), the airport availability and suitability system 100 processes the user selection to determine all "related items" in each of the three sections (202, 204, and 206). Responsive to determining related items to the user's selection, the airport availability and suitability system 100 visually distinguishes the related items on the image by rendering related items in a second presentation style.

As may be readily appreciated, more than one change in data may be identified, and accordingly, the airport availability and suitability system 100 processes the more than one change in data 574 to determine, for each one of the more than one change in data, all "related items," in each of the three sections (202, 204, and 206). In a scenario with multiple changes in data, a user may enjoy the advantage of scrolling through and selecting one change in data at a time to study how the selected piece of information is related to other information on the displayed image 110.

With reference again to FIG. 3, the selected change in data 574 is determined to be related to the item 570 that recites, "RWY 27R 10800 ft. ILS." Accordingly, the related item 570 and the change in data 574 are both visually distinguished from the remaining alphanumeric information on image 300 by rendering them in a second presentation style. In FIG. 3, the second presentation style depicts the boundary of region 506 and of second NOTAM 514 being dashed, and the respective text also being outlined in a dashed border. However, in various embodiments the second presentation style may comprise a change of font color, border/boundary color, background color, and/or utilize highlighting or hatching. Regardless of the method utilized for visually distinguishing related items, the result is that the related items are each in a second presentation style that is different from and visually distinguishable over the default or first presentation style.

Figure 4:
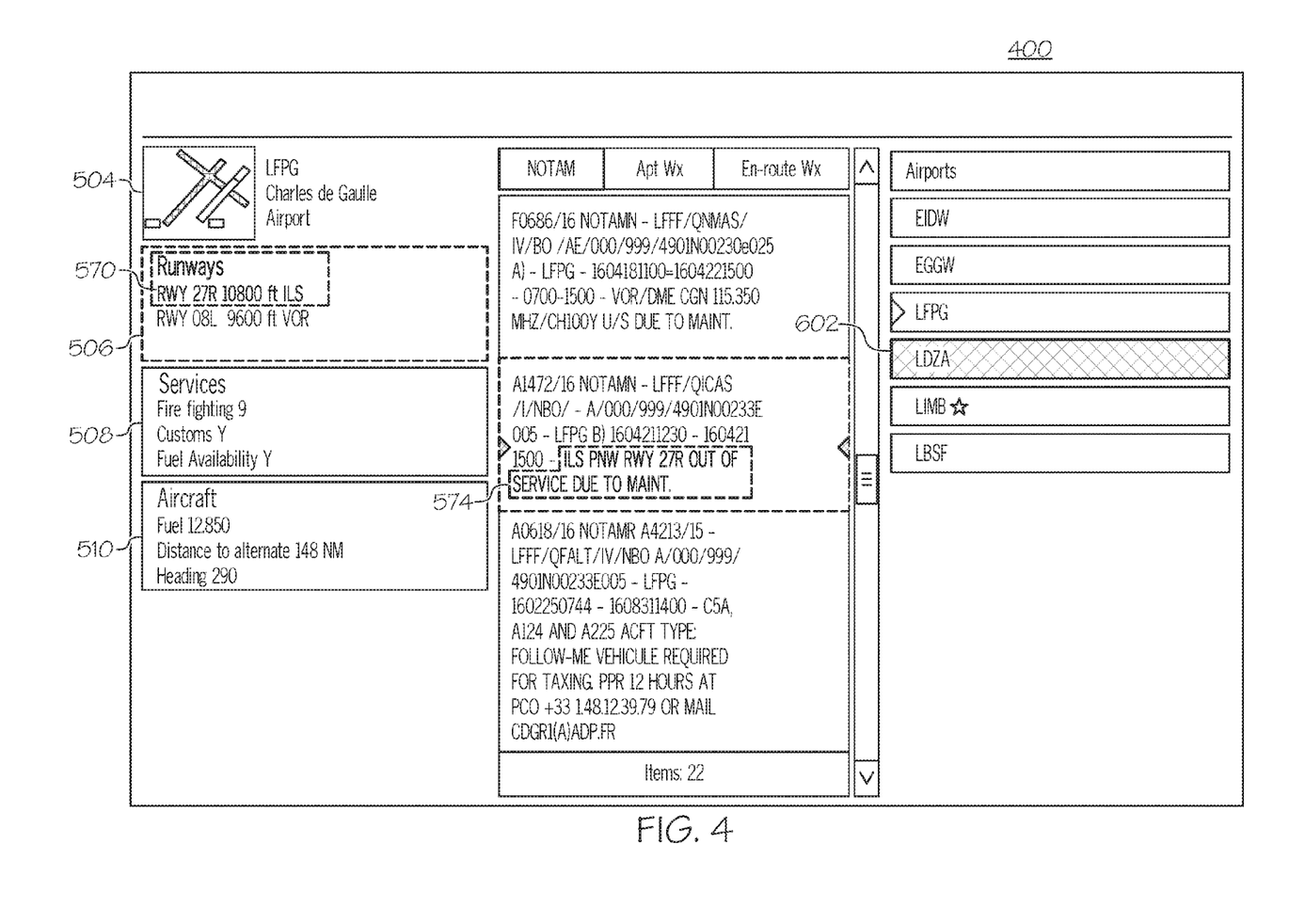
FIG. 4 is another image rendered on the aircraft information display device in accordance with various embodiments.
Figure 6:
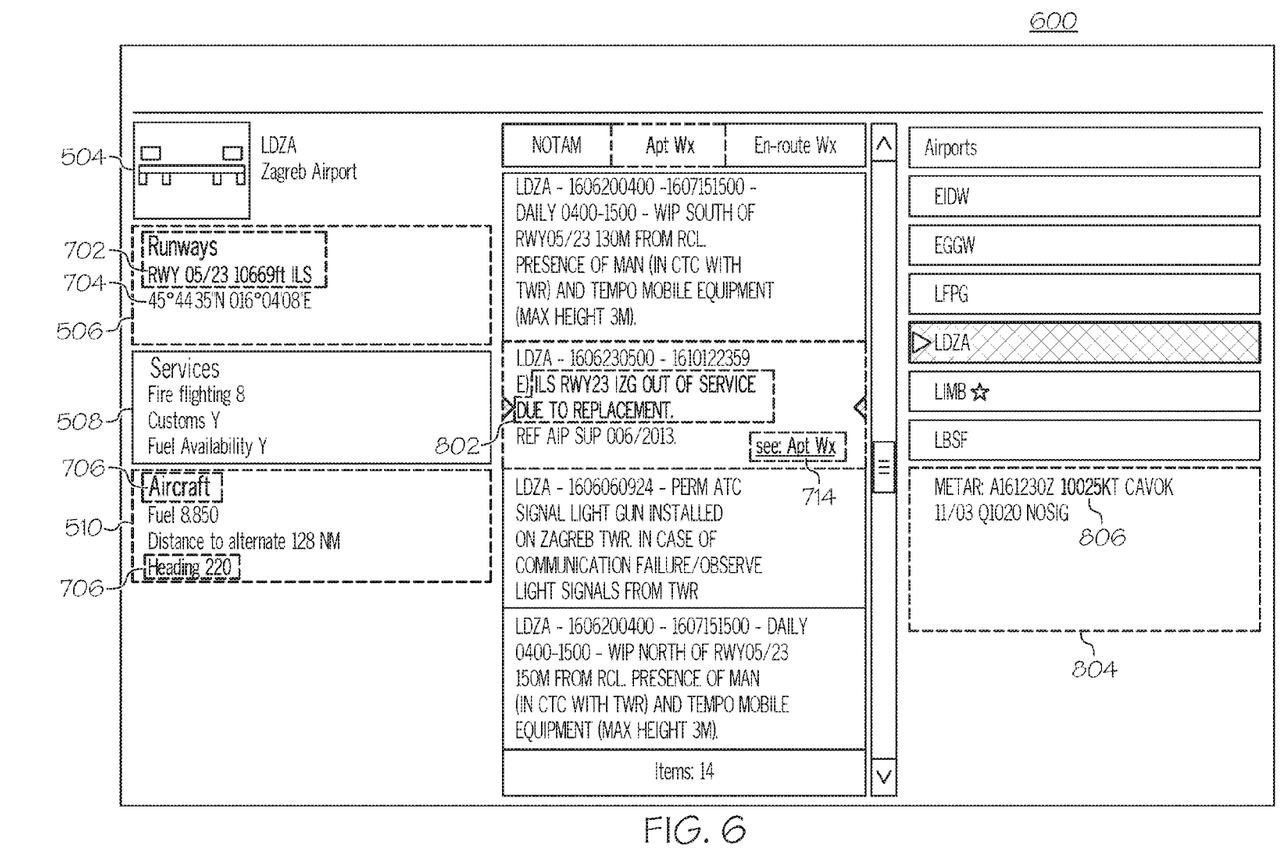
FIG. 6 is an image rendered on the aircraft information display device showing additional detail, generated in accordance with various embodiments.

After the user views the related items, the user may want to consider airport information for an alternative airport. To do so, the user selects, via the user input device 106, an alternative airport. In FIG. 4, the button/tab for alternative airport "LDZA" 602, as determined by the airport availability and suitability system 100 is highlighted, which is displayed in black and white as cross hatching. The LDZA button is highlighted to indicate that the airport availability and suitability system 100 has determined that some information changed in association with that airport. A user selects the alternate LDZA airport button/tab (whose status changed) by moving the LDZA label to the position indicator 502. Responsive to the detected user selection of the alternate airport LDZA 602, the airport availability and suitability system 100 updates (i.e., re-generates and renders) the image 600, as shown in FIG. 6, wherein the position indicator 502 points to the selected button/tab. In FIG. 6 LDZA airport information and status items are rendered in the first section 202 and suitability items (comprising weather data and tactical data) associated with LDZA are rendered in the second section 204. In the second section 204, the NOTAM tab 554 is selected, and NOTAM 710, NOTAM 712, NOTAM 716, and NOTAM 718 are rendered as alphanumeric information in respective text boxes, each having its own border. Text banner 212 indicates that there are 14 NOTAM items associated with LDZA.

Figure 5:
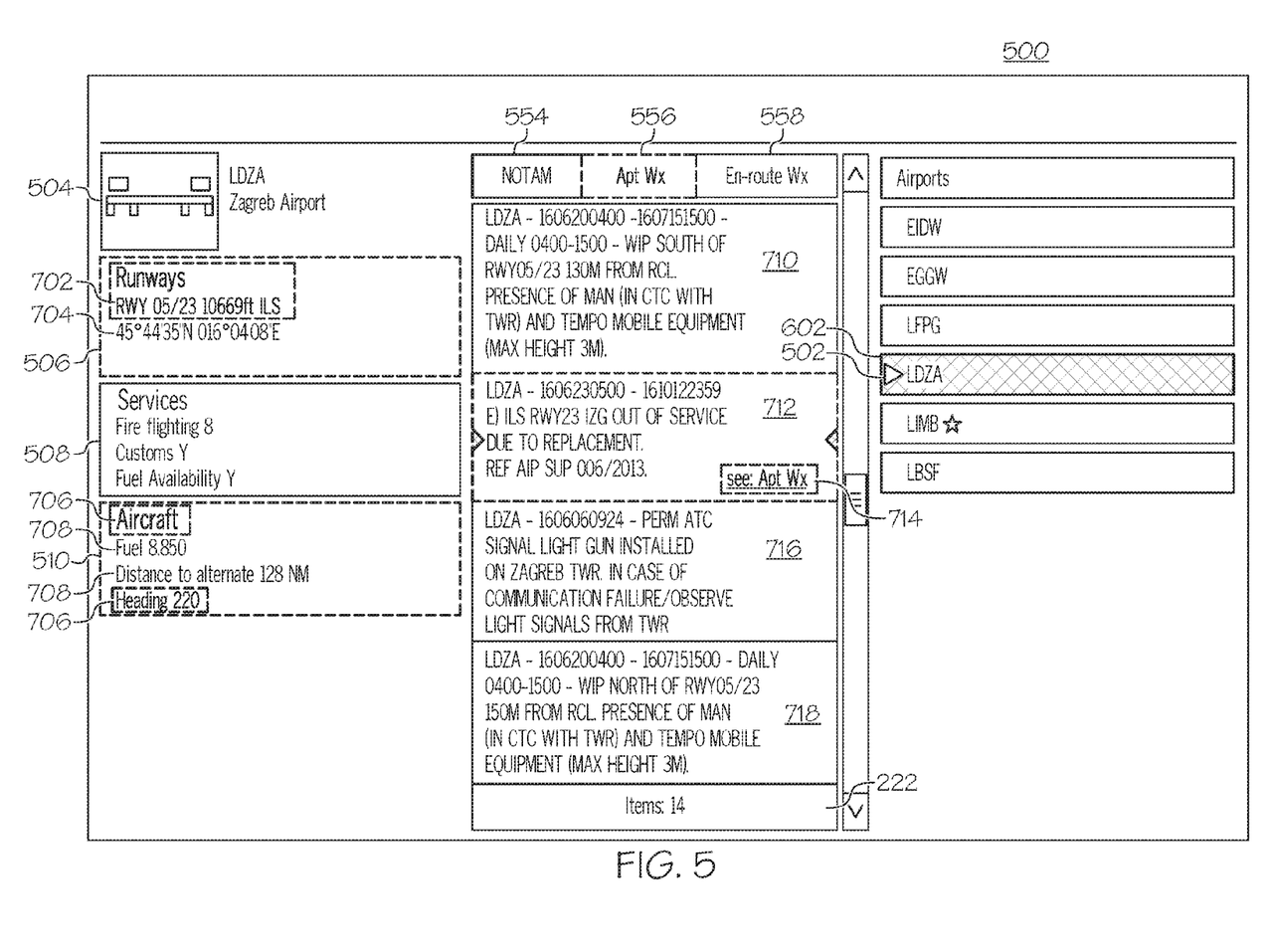
FIG. 5 is an image rendered on the aircraft information display device showing a selected alternate airport, generated in accordance with various embodiments.

As is observable in FIG. 5, NOTAM 712 comprises alphanumeric information comprising a warning including "RWY23 OUT OF SERVICE." When a user wishes to view all information related to this warning, the user may select the warning by scrolling the alphanumeric information on the displayed image 110 until symbol 210 is pointing to NOTAM 712. Responsive to the user moving symbol 210 to select NOTAM 712, the airport availability and suitability system 100 determines related items, and visually distinguishes the related items on the displayed image 400. In FIG. 5, one or more airport weather items are determined to be related items, as indicated by "see: Apt Wx" 714. Also, in the first section, runways information for RWY 05/23 (702) is determined to be related, and aircraft heading 220 (706) is determined to be related. Accordingly, the boundaries/borders of NOTAM 712, region 506 and region 510 are visually distinguished, and the alphanumeric information 702, 706, and 714 is visually distinguished. Again, visually distinguishing comprises rendering the visually distinguished items in a second presentation style, different than the first presentation style. For example, alphanumeric information 704, alphanumeric information 708, and other nonrelated alphanumeric information on rendered image 500 remains in the default or first presentation style.

When a user selects, from within NOTAM 712, "see: Apt Wx" 714 (to see airport weather), additional related weather information may be presented on a pop-up display. In FIG. 6, image 600 shows a pop-up text box labeled "METAR" 804, which displays the most recent meteorological observations associated with the LDZE airport, in accordance with various embodiments. In FIG. 6, in addition to the information rendered in the second presentation style as depicted in FIG. 5, the airport availability and suitability system 100 displays (i) the METAR 804 boundary, (ii) "ILS RWY23 IZG OUT OF SERVICE DUE TO REPLACEMENT" 802 and (iii) "10025KT" 806 in the second presentation style.

Figure 7:
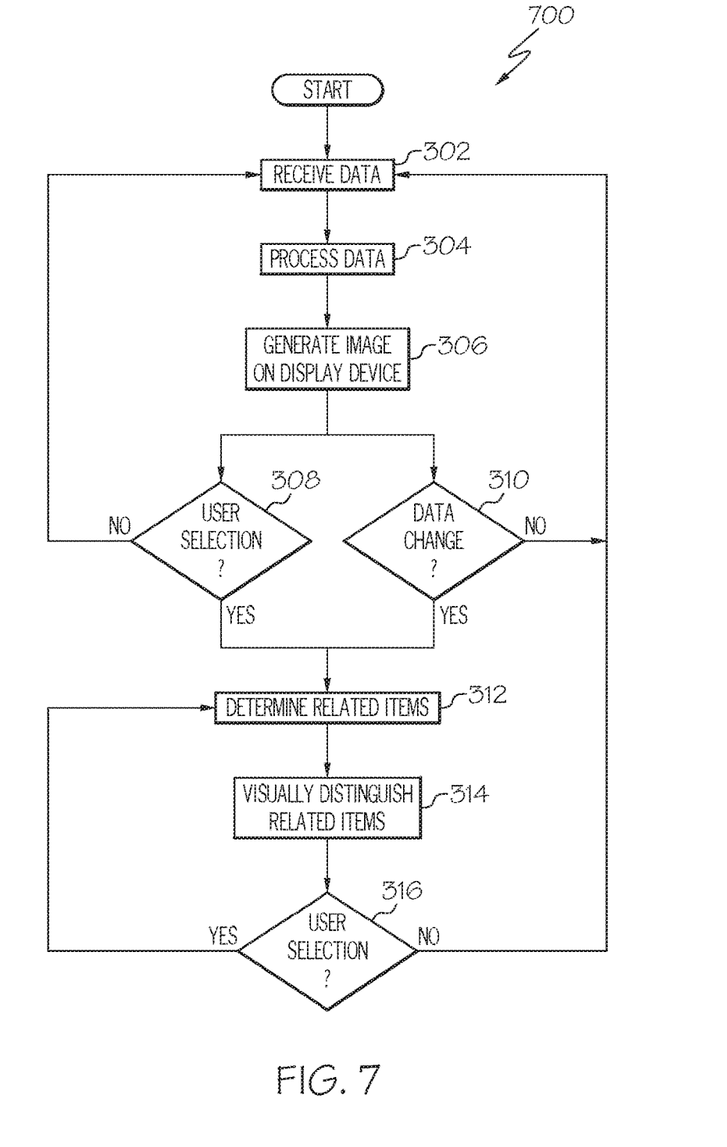
FIG. 7 is a flow chart describing a process for an airport availability and suitability system, in accordance with various embodiments.

FIG. 7 is a flow chart describing a process 700 for an airport availability and suitability system, in accordance with various embodiments. Process 700 steps may be performed by the airport suitability module 102. It is readily understood that process 700 may be integrated into other system programs, and that embodiments of process 700 may differently arrange steps, and/or add or delete steps without straying from the scope of the invention.

Data, including up-to-date Aviation Information Publication (AIP) data, aircraft status data, aircraft location data, weather data, airport static information, relatedness rules, and tactical data, is received from respective sources at STEP 302. At STEP 304, the data is processed, which comprises parsing data and referencing category and topic rules stored in a database 124. An image 110 is generated on the display device 108 at STEP 306. Generating an image comprises formatting the processed data and rendering the generated image by applying the first presentation style and the second presentation style as described herein. At STEP 308 a first user selection is received, and at STEP 310 a change in data is identified. STEP 308 may also precede or follow STEP 310. Process 700 determines related items at STEP 312, which is described in more detail in connection with FIG. 8. In STEP 314, the image is updated, which comprises regenerating the image and rendering the image on the display device 108 such that related items are visually distinguished on the image 110 from unrelated items. At STEP 316, a second user selection is received and process 700 returns to STEP 312 responsive thereto.

Figure 8:
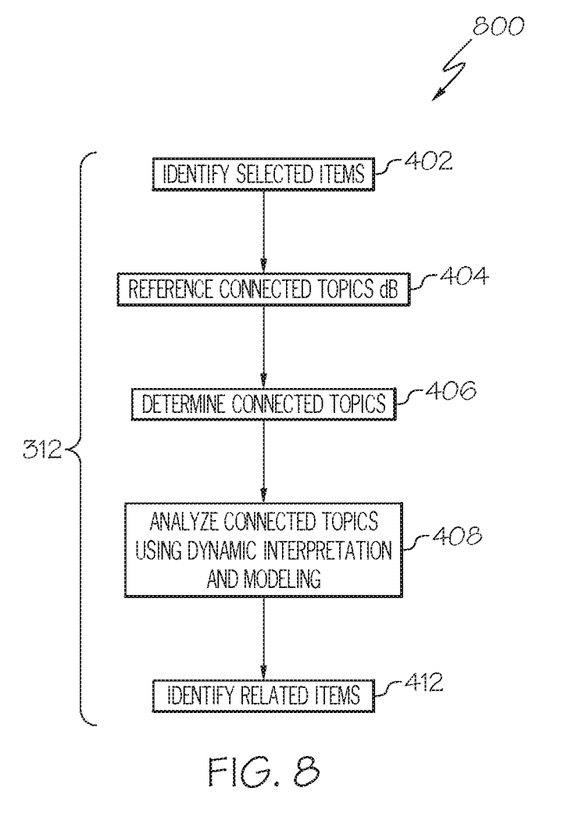
FIG. 8 is a flow chart providing additional detail to the flow chart of FIG. 7.

Determining related items (STEP 312) comprises several steps, as shown in FIG. 8, process 800. First, the selected item is identified based on the user selection at STEP 308 or STEP 402. The aforementioned "relatedness rules," which comprise program code, pre-defined rules for relations among various pieces of information, rules, and algorithms sufficient to perform the functions described herein are referenced in STEP 404. Process 800 uses the selected item to reference a source of connected topics, such as a connected topics database stored in the memory device(s) 122 at STEP 404. The connected topics database comprises rules for how items of data are associated with topics, and how the topics are related. Following STEP 404, process 700 determines one or more connected topics (i.e., topics connected to the selected item) at STEP 406. In STEP 408, the one or more connected topics are analyzed to identify connected items. Analyzing in STEP 408 comprises using dynamic interpretation and modeling. At STEP 412, responsive to the analyzing in STEP 408, the connected items are identified as "related items." After determining related items (STEP 312), process 700 returns to STEP 314 in FIG. 7.

Thus, there has been provided a system and method for an improved aircraft information display. The provided embodiments integrate and analyze relevant data from on-board and external sources to render airport availability and suitability information on the aircraft information display. The airport availability and suitability information is intuitively arranged and dynamically updated on the display, responsive to user interaction.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system of displaying airport information on a portable electronic device (PED), the PED comprising a display device, the system comprising:

a source of Aviation Information Publication (AIP) data;

a memory device comprising connected topics and airport static information and relatedness rules; and a processor configured to process received data from the source of AIP data, the memory device, a source of aircraft status data, a source of aircraft location data, a source of weather data, and a source of tactical data, to:

generate an image on the display device, the image concurrently rendering three substantially abutted sections: (a) airport information items including an airport image showing a runways layout, alphanumeric runway information, and services at the airport, and aircraft status data in a first section, (b) a plurality of suitability items comprising weather data at the airport, weather data en-route and tactical data in a second section, and (c) airport options in a third section;

identify changes in the received data from the source of AIP data, the memory device, the source of aircraft status data, the source of aircraft location data, the source of weather data, and a source of tactical data;

responsive to each identified change, determine one or more topics connected to the identified change in the received data, referred to as the connected topics;

analyze the connected topics to identify related items, wherein the related items are defined as (a) all airport information items affected by the identified change in the received data (b) all suitability items affected by the identified change in the received data, and (c) all aircraft status data affected by the identified change in the received data; and visually distinguish the identified related items from the unrelated items in each of the three sections, thereby creating visually distinguished items;

render a position indicator;

detect a first user selection, in which a user has scrolled a visually distinguished item to the position indicator; and responsive to the first user selection, determine one or more topics connected to the first user selection, identify items related to the first user selection, and regenerate the image such that the identified items related to the first user selection are visually distinguished in each of the three sections on the image from items not related to the first user selection.

2. The system of claim 1, wherein the processor is further configured to
render a symbol in the second section;
detect a second user selection, in which a user has scrolled a visually distinguished item to the second symbol; and
responsive to the second user selection:
determine one or more topics connected to the second user selection, identify items related to the second user selection, and
visually distinguish the identified items related to the second user selection from items not related to the second user selection.

3. The system of claim 2, wherein the processor analyzes the connected topics using dynamic interpretation and modelling.

4. The system of claim 1, wherein the processor is further configured to render each item of the first section inside a respective text box.

5. The system of claim 4, wherein the processor is further configured to render each item of the second section as alphanumeric information inside a respective text box.

6. The system of claim 5, wherein the processor is further configured to render each item of the third section as alphanumeric information inside a respective text box.

7. The system of claim 6, wherein the processor is further configured to render each text box with a visually distinguishable boundary.

8. The system of claim 1, wherein the first presentation style comprises a black background, white font, and white boundaries.

9. The system of claim 8, wherein the second presentation style comprises a black background, yellow font, and yellow boundaries.

10. A method of displaying airport information on a portable electronic device (PED), the PED comprising a display device, the method comprising:
receiving, from a source of Aviation Information Publication (AIP) data, AIP data;
receiving from an on-board data source, aircraft status data and aircraft location data;
receiving from an external source, weather data and tactical data; and
on the display device, concurrently rendering, in a first presentation style, three abutted sections: (a) a first section comprising airport information items and aircraft status data, including an airport image showing a runways layout, alphanumeric runway information, and services at the airport, and aircraft status data, including fuel remaining, (b) a second section rendering a plurality of suitability items comprising weather data at the airport, weather data en-route, and tactical data, and (c) a third section rendering airport options,
identifying changes in the received data,
responsive to each identified change in the received data,
referencing a source of connected topics to determine one or more topics connected to the change in the received data, referred to as the connected topics, and
analyzing the one or more connected topics to identify related items, wherein the related items are defined as (a) all airport information items affected by the identified change in the received data (b) all suitability items affected by the identified change in the received data, and (c) all aircraft status data affected by the identified change in the received data; and
visually distinguishing the identified related items in each of the three sections on the image from the unrelated items;
rendering a position indicator;
detecting a first user selection, in which a user has scrolled a visually distinguished item to the position indicator; and
responsive to the first user selection:
determining one or more topics connected to the first user selection,
identifying items related to the first user selection, and
regenerating the image such that the identified items related to the first user selection are visually distinguished in each of the three sections on the image from items not related to the first user selection.

11. The method of claim 10, further comprising,
rendering a symbol in the second section;
detecting a second user selection, in which a user has scrolled a visually distinguished item to the second symbol; and
responsive to the second user selection:
determining one or more topics connected to the second user selection, identifying items related to the second user selection, and
visually distinguishing the identified items related to the second user selection from items not related to the second user selection.

12. A system of displaying airport information on a portable electronic device (PED), the PED comprising a display device, the system comprising:
a source of Aviation Information Publication (AIP) data;
a source of connected topics rules;
a source of airport static information and relatedness rules; and
a processor configured to process received data from the source of AIP data, the source of connected topics rules, the source of airport static information and relatedness rules, a source of aircraft status data, a source of aircraft location data, a source of weather data, and a source of tactical data, to:
concurrently render, on the display device, three substantially abutted sections: (a) a first section, comprising airport information items including an airport image showing a runways layout, alphanumeric runway information, services at the airport, and aircraft status data, (b) a second section-rendering a plurality of suitability items comprising weather data at the airport, weather data en-route and tactical data in a second section, and (c) a third section rendering airport options;
responsive to each identified change in any of: AIP data, airport static information and relatedness rules, aircraft status data, aircraft location data, weather data, and tactical data, identify respective related items in each of the three sections, related items being defined as (a) all airport information items affected by the identified change in the received data (b) all suitability items affected by the identified change in the received data, and (c) all aircraft status data affected by the identified change in the received data; and
visually distinguish the identified related items in each of the three sections from the unrelated items, thereby creating visually distinguished items;
render a position indicator on the third section;

render a symbol on the second section;
detect an occurrence of user selection, including: a user has scrolled a visually distinguished item to the position indicator, or the user has scrolled a visually distinguished item to the symbol;
and
  responsive to the user selection:
    identify items related to the first user selection, and
    visually distinguish the identified items in each of the three sections from items not related to the user selection.

\* \* \* \* \*